(12) United States Patent
Baumgartner et al.

(10) Patent No.: US 10,394,987 B2
(45) Date of Patent: *Aug. 27, 2019

(54) ADAPTIVE BUG-SEARCH DEPTH FOR SIMPLE AND DEEP COUNTEREXAMPLES

(71) Applicant: International Business Machines Corporation, Armonk, NY (US)

(72) Inventors: Jason R. Baumgartner, Austin, TX (US); Raj K. Gajavelly, Andhra Pradesh (IN); Hari Mony, Austin, TX (US); Pradeep K. Nalla, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 24 days.

This patent is subject to a terminal disclaimer.

(21) Appl. No.: 15/464,808

(22) Filed: Mar. 21, 2017

(65) Prior Publication Data

US 2018/0276317 A1    Sep. 27, 2018

(51) Int. Cl.
*G06F 17/50* (2006.01)

(52) U.S. Cl.
CPC ........ *G06F 17/504* (2013.01); *G06F 17/5077* (2013.01)

(58) Field of Classification Search
CPC ............................ G06F 17/504; G05F 17/5077

(Continued)

(56) References Cited

U.S. PATENT DOCUMENTS 7,356,451 B2 *  4/2008  Moon ................. G06F 17/5031
                                                    703/19
8,271,253 B2     9/2012  Ward
(Continued)

FOREIGN PATENT DOCUMENTS

WO         02091239 A2   11/2002
WO      2012176317 A1   12/2012
WO      2014137381 A1    9/2014

OTHER PUBLICATIONS

Chang, Kai-hui, et al.; "Simulation-Based Bug Trace Minimization with BMC-Based Refinement" IEEE Trans. on CAD of Integrated Circuits and Systems 26(1): 152-165 (2007).

(Continued)

*Primary Examiner* — Suchin Parihar
(74) *Attorney, Agent, or Firm* — Cantor Colburn LLP; Erik Johnson (57) ABSTRACT

Aspects of the present invention include methods, systems and computer program products. The method includes a processor providing a netlist indicative of connectivity and functional states of components of an integrated circuit design; iteratively searching through the netlist at a selected depth to locate errors within the netlist by a plurality of trials, each of the plurality of trials having a plurality of iterations; adaptively adjusting the selected depth depending on any errors within the netlist being located, the selected depth increasing over time from an initial value as between the plurality of iterations; and adaptively adjusting an amount of coverage of the netlist depending on any errors within the netlist being located, the amount of coverage of the netlist decreasing over time from an initial amount as between the plurality of iterations.

11 Claims, 8 Drawing Sheets

(58) Field of Classification Search
USPC .......................................................... 716/111
See application file for complete search history.

(56) References Cited

U.S. PATENT DOCUMENTS

| | | | | |
|---|---|---|---|---|
| 8,341,567 | B1* | 12/2012 | Tiwary | G06F 17/504 716/106 |
| 2003/0126120 | A1 | 7/2003 | Faybishenko et al. | |
| 2003/0208721 | A1* | 11/2003 | Regnier | G06F 17/5022 716/106 |
| 2004/0154009 | A1 | 8/2004 | Reynaud | |
| 2004/0230407 | A1* | 11/2004 | Gupta | G06F 17/504 703/2 |
| 2007/0174799 | A1* | 7/2007 | Baumgartner | G06F 17/504 716/103 |
| 2008/0295043 | A1* | 11/2008 | Chang | G06F 17/5045 716/103 |
| 2011/0320991 | A1* | 12/2011 | Hsu | G06F 17/5022 716/103 |
| 2011/0320994 | A1* | 12/2011 | Nakamura | G06F 17/505 716/114 |
| 2013/0205397 | A1 | 8/2013 | De Barros et al. | |
| 2016/0078141 | A1 | 3/2016 | Fang | |

OTHER PUBLICATIONS

De Paula, Flavio, M.,; "An Effective Guidance Strategy for Abstraction-Guided Simulation Simulation"; DAC; 2007.

Kuelmann, Andreas, et al.; "Probabilistic State Space Search" ICCAD; 1999; pp. 574-579.

Mony, Hari, et al; "Exploiting Suspected Redundancy Without Proving It" Design Automation Conference, Jun. 2005.

Petrovic, Smiljana, V, et al.; "Tailoring a Mixture of Search Heuristics" Constraint Programming Letters; vol. 4; 2009; 15-38 pages.

Shyam, Smitha, et al; "Distance-Guided Hybrid Verification with GUIDO"; Advanced Computer Architectura Lab, University of Michigan; 2006; pp. 1211-1216.

Wang, Zhuo, et al.; "Multi-Neighborhood Local Search Optimization for Machine Reassignment Problem"; Computers & Operations Research 68 (2016) 16-29.

Yang, C. Han, et al.;"Submitted to IEEE International High Level Design Validation and Test Workshop, Topic: High Level Design Validation—SpotLight: Best-First Search of FSM State Space"; Aug. 7, 1996; 1-4 pages.

Jason R. Baumgartner et al., Pending U.S. Appl. No. 15/791,620 entitled "Adaptive Bug-Search Depth for Simple and Deepcounterexamples," filed Oct. 24, 2017.

List of IBM Patents or Patent Applictions Treated as Related; (Appendix P), Filed Oct. 24, 2017, 2 pages.

* cited by examiner

ADAPTIVE BUG-SEARCH DEPTH FOR SIMPLE AND DEEP COUNTEREXAMPLES

BACKGROUND

The present invention relates in general to hardware design and manufacturing, and more specifically, to methods, systems and computer program products for verification of an integrated circuit design.

In the field of electronic hardware design and manufacturing (e.g., computing or processing circuit design within an integrated circuit (IC) or semiconductor chip), verification of the often relatively complex hardware design prior to manufacturing is paramount. Unchecked or unfound subtle design flaws, errors or "bugs" pose various types of risk. Thus, numerous and various techniques exist for hardware design verification, including the related task of security verification. These techniques oftentimes comprise a significant portion of the total cost of the overall hardware design.

SUMMARY

According to one or more embodiments of the present invention, a computer-implemented method of designing an integrated circuit includes providing, by a processor, a netlist indicative of connectivity and functional states of components of the integrated circuit design; and iteratively searching, by the processor, through the netlist at a selected depth to locate errors within the netlist by a plurality of trials, each of the plurality of trials having a plurality of iterations. The method further includes adaptively adjusting, by the processor, the selected depth depending on any errors within the netlist being located, the selected depth increasing over time from an initial value as between the plurality of iterations; and adaptively adjusting, by the processor, an amount of coverage of the netlist depending on any errors within the netlist being located, the amount of coverage of the netlist decreasing over time from an initial amount as between the plurality of iterations.

According to another embodiment of the present invention, a computer system includes a processor in communication with one or more types of memory, the processor configured to provide a netlist indicative of connectivity and functional states of components of an integrated circuit design; and to iteratively search through the netlist at a selected depth to locate errors within the netlist by a plurality of trials, each of the plurality of trials having a plurality of iterations. The processor is further configured to adaptively adjust the selected depth depending on any errors within the netlist being located, the selected depth increasing over time from an initial value as between the plurality of iterations; and to adaptively adjust an amount of coverage of the netlist depending on any errors within the netlist being located, the amount of coverage of the netlist decreasing over time from an initial amount as between the plurality of iterations.

According to yet another embodiment of the present invention, a computer program product includes a storage medium readable by a processing circuit and storing instructions for execution by the processing circuit for performing a method of designing an integrated circuit that includes providing a netlist indicative of connectivity and functional states of components of an integrated circuit design; and iteratively searching through the netlist at a selected depth to locate errors within the netlist by a plurality of trials, each of the plurality of trials having a plurality of iterations. The method further includes adaptively adjusting the selected depth depending on any errors within the netlist being located, the selected depth increasing over time from an initial value as between the plurality of iterations; and adaptively adjusting an amount of coverage of the netlist depending on any errors within the netlist being located, the amount of coverage of the netlist decreasing over time from an initial amount as between the plurality of iterations.

Additional features and advantages are realized through the techniques of the present invention. Such additional features and advantages, as well as other embodiments and aspects of the invention, are considered a part of the claimed invention. The subject matter which is regarded as the invention is particularly pointed out and distinctly claimed in the claims at the conclusion of the specification.

BRIEF DESCRIPTION OF THE DRAWINGS

The foregoing and other features, and advantages of the invention are apparent from the following detailed description taken in conjunction with the accompanying drawings in which:

FIG. 4, including FIGS. 4A, 4B, and 4C, is a flow diagram of a method of designing an integrated circuit in accordance with one or more embodiments of the present invention;

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
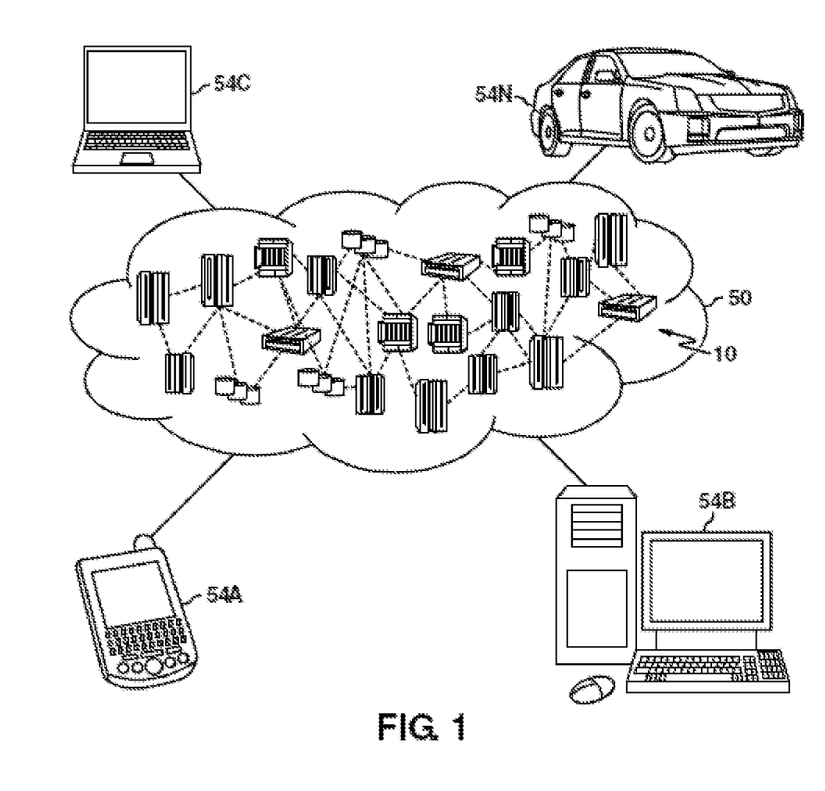
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
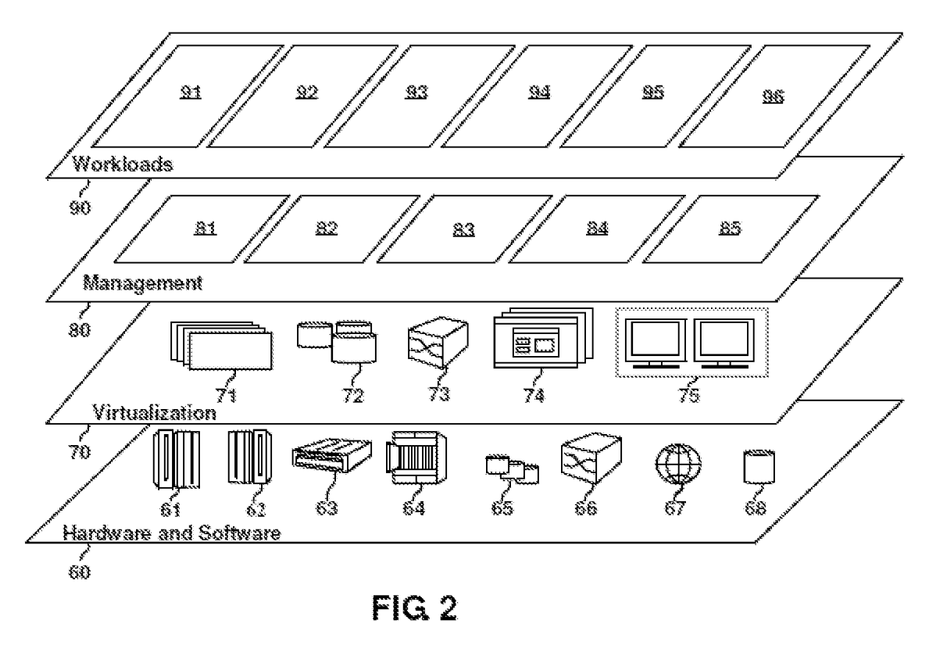
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a method 96 for semi-formal bug hunting within an integrated circuit design in accordance with one or more embodiments of the present invention.

Figure 3:
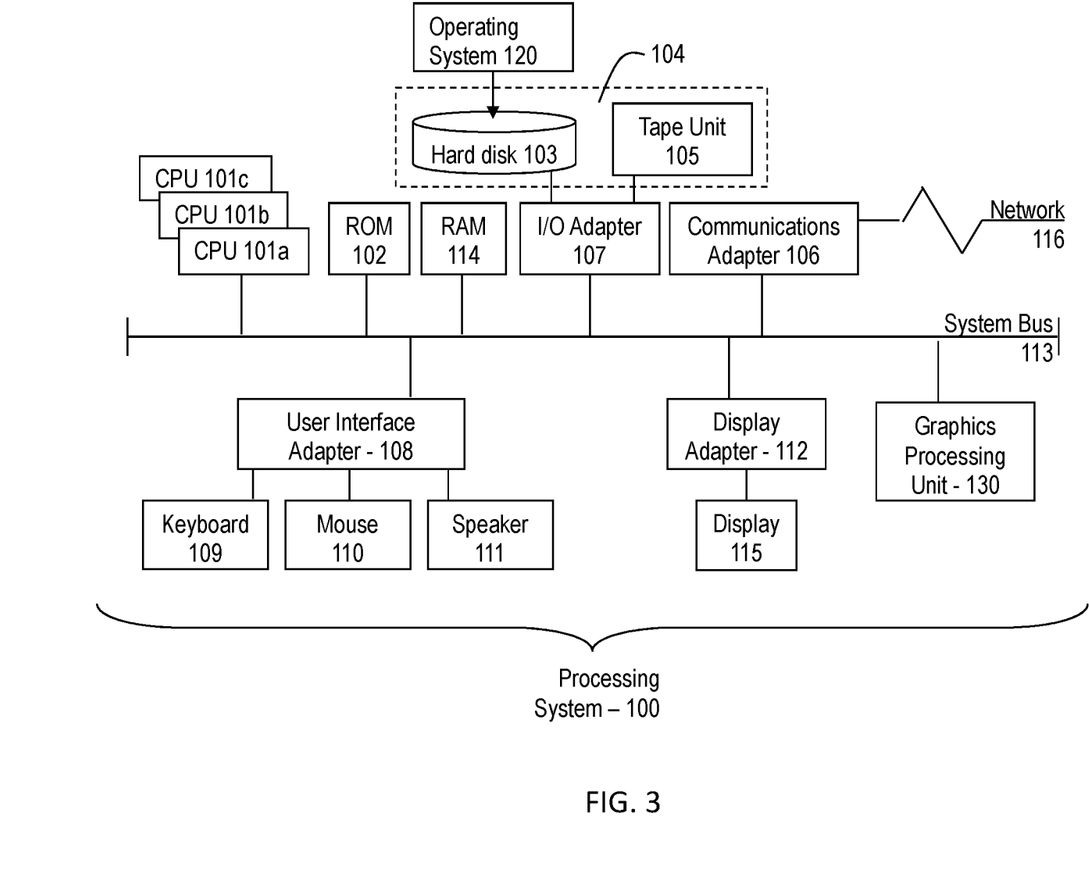
FIG. 3 is a block diagram illustrating one example of a processing system for practice of the teachings herein.

Referring to FIG. 3, there is shown a processing system 100 for implementing the teachings herein according to one or more embodiments. The system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. Hard disk 103 and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

In accordance with one or more embodiments of the present invention, methods, systems, and computer program products are disclosed for semi-formal bug hunting within an integrated circuit design.

By way of overview, the verification of an electronic hardware (e.g., integrated circuit) design is a critical necessity, but most often it is a relatively complex, time-consuming and costly process. This is primarily because the hardware design itself is relatively very complex, typically having many varied bit-level logic designs and data paths, performance-related artifacts (e.g., pipelining, out-of-order execution, multithreading, power-saving techniques), and pervasive features such as initialization logic and runtime monitoring logic.

There are two fundamental challenges in the hardware design verification process which account for its relatively large cost. First is the problem of exposing or "hunting for," searching for, or locating a design flaw, error or bug. In the worst case, the complexity of this task grows exponentially with respect to design size. Second, once a design flaw is exposed or found, the process of triaging the flaw and identifying what specifically within the design (or verification setup) must be remedied can be a laborious one.

A plethora of techniques have been proposed to deal with these two challenges. One is "semi-formal bug hunting," which attempts to bridge the strength of formal verification with that of simulation. A simulation is a scalable approach to bug-hunting which can be applied to hardware designs of virtually any size. Simulation is the most widely used modern approach, due primarily to its scalability. However, simulation suffers from inherent coverage problems that limit the subset of logic behavior which can be explicitly explored one state at a time to a relatively very small fraction. In contrast, formal verification approaches leverage symbolic algorithms, which can cover a large number of states, albeit only for relatively smaller design components. Formal verification tends to overcome the coverage limitations of simulation, due to its inherent exhaustiveness. However, inherent scalability issues exist with formal verification.

As a compromise between the two approaches, semi-formal bug hunting hardware verification techniques attempt to achieve synergy between simulation and formal verification, leveraging symbolic formal algorithms in an incomplete way, for as large of overall design coverage as possible (i.e., relatively greater scalability than with formal verification).

Embodiments of the present invention provide an improved semi-formal bug hunting hardware design verification technique or approach that adaptively tailors its search for design flaws to the native depth of a given netlist or testbench. Adapting the search depth is done to both more effectively and automatically find relatively deep bugs or flaws and also avoid unnecessarily deep counterexamples for relatively simple or shallow bugs. That is, the search depth is adapted to avoid deeper-than-necessary counterexamples on the one hand, while also enabling a deep-enough search to find relatively deep counterexamples on the other hand. This is performed without a need for manual configuration of the semi-formal search process.

In the field of electronic hardware design verification, the term "property" commonly refers to or represents the verification objective. Certain gates in the hardware design are labeled as "properties," which may be of two types: safety properties and liveness properties. Safety properties are the most commonly occurring, representing assertions to be verified of a sequential logical design, coverage objectives to be exposed, or equivalences to be demonstrated between two variants of a design in equivalence checking. In a semi-formal search framework, secondary coverage properties called "lighthouses" may often be dynamically created and searched for, representing rare netlist scenarios, possibly scenarios deemed near to a primary property failure. Also, the term "counterexample" commonly refers to a trace illustrating a property failure. The term "bug" commonly refers to a flaw in the netlist that is responsible for a failed property.

A netlist format is commonly used to represent the connectivity of the various components (e.g., logic systems) of the hardware or integrated circuit design under verification. A netlist typically contains a directed graph with vertices representing gates, and edges representing interconnections between those gates. The gates are logic elements having associated functions, such as constants, primary inputs and other sources of nondeterminism, combinational logic such as AND gates, simple sequential elements (registers), and memory arrays. Registers have two associated components: their next-state functions, and their initial-value functions. Both are represented as other gates in the graph. A "state" refers to a valuation of the sequential gates. A "trace" represents a sequence of valuations to the gates of a netlist over time, beginning from an initial state and consistent with the semantics of the gates. Memory arrays represent two-dimensional grids of registers, arranged as rows versus columns. The contents of memory arrays are read or written via dedicated "ports" of three types: read ports, initialization ports, and write ports.

The "depth" of a netlist commonly refers to the depth as measured with respect to the number of cycles (e.g., simulation cycles) being performed in a verification process. A "deep" or "deeper" search means that simulation is being performed for a relatively large or increasing number of cycles. In contrast, a "simple," "shallow" or "shallower" search means that simulation is being performed for a relatively small or decreasing number of cycles. In other words, if the netlist depth is high, large or deep, then a larger number of simulation cycles may be needed to adequately converge on the coverage, whereas if the netlist depth is low, small or shallow, then a smaller number of simulation cycles may be needed to adequately converge on the coverage. Embodiments of the present invention can reach a depth of several thousand cycles, for example. A common netlist format is the And/Inverter Graph (MG), where all combinational gates are decomposed into two-input AND gates (conjunction), while "inversions" are denoted by an attribute on a gate reference (edge).

Simulation typically explores netlist behavior and exposes bugs by evaluating the netlist relative to one random trace at a time—or in the case of bit-parallel simulation, N random traces at a time. Formal verification often operates through reasoning about the netlist using symbolic algorithms, as opposed to explicit state reasoning as with simulation, thereby covering a potentially large number of traces that would be infeasible to cover using explicit analysis alone. Semi-formal bug hunting can operate by leveraging together resource-constrained symbolic algorithms with simulation starting from interesting states reached using a combination of simulation and symbolic algorithms. In addition, semi-formal bug-hunting techniques can orchestrate against trials (cycles) and iterations. Each trial is a search that begins from the original initial states of the netlist. Each iteration begins from a set of states selected from a prior iteration or search. Effectively, each iteration concatenates or links together timesteps to a trace starting from the initial states at iteration zero of a trial. When a property is falsified in an iteration, the process of computing a counterexample trace merely concatenates the trace from the current iteration to the trace seeded or placed into the iteration.

It can be beneficial to perform multiple searches from the initial states, as a netlist generally has multiple initial states, and property failures may only be reachable along a subset of these. In general, decisions made earlier in a trace may preclude the reachability of states later in that trace. Also, it is often desirable for counterexamples to be as short as possible since the manual effort involved in triaging counterexamples is often proportional to their length. Additionally, computational requirements of counterexample generation (i.e., providing a counterexample trace to a user of the semi-formal bug hunting tool) are proportional to trace length. Furthermore, in native array modeling, there is usually additional computational overhead in a deeper search to represent a longer history of array "contents" (i.e., written and read values). If a semi-formal search never returned to the initial states, it could only produce monotonically growing traces.

Thus, it can be beneficial to perform multiple iterations per trial, because a symbolic search requires exponentially growing resources with search depth (i.e., a symbolic search becomes prohibitive after a given depth). By seeding or placing later iterations into deeper states, the relatively high coverage of a symbolic search is leveraged from states that practically may not be reached using symbolic methods alone. Also, while simulation is not similarly scalability-challenged, it can be beneficial to guide simulation to prevent it from wasting resources exploring uninteresting states.

A fundamental challenge for semi-formal bug-hunting techniques is to decide how deep of a simulation to perform in each iteration, and how many iterations to perform per trial. While a relatively shallower search is generally desirable for the above reasons, if the netlist is intrinsically deep (i.e., has counterexamples whose shortest-length is relatively long) unless adequate resources are spent in performing a deeper search, these property failures may never be identified.

Embodiments of the present invention approximate coverage of a search for bugs or errors in a hardware or integrated circuit design, relative to different search depths, starting from a relatively shallow depth. This is done to avoid the undesired consequences of a deeper-than-necessary search. As long as unique coverage is achieved in deeper searches, this is indicative that the netlist inherently has deeper behavior that must be explored to avoid missing the identification of deep property failures. Thus, in embodiments, the search is gradually deepened as long as doing so has a positive impact on coverage.

There are two primary methods to measure coverage in a semi-formal bug hunting technique. First, state coverage analysis can be used to identify "rare" states to seed or place into deeper iterations of the search. Since for larger netlists, it is relatively difficult to attempt to enumerate and explore every reachable state, the coverage analysis is usually done in a lossy manner. A common coverage framework can partition the netlist into relatively small partitions, e.g., of 8 or 16 register partitions, and can compute or determine the number of times a reached netlist state projected down to each of the partition states has actually been encountered during a search. Reached states that expose the most partition states for the first time, or even the first few times, are considered more "rare." A partition state that is encountered for the first time during a search of depth "k" is known to be reachable at depth "k," although it may also be reachable along a search of shallower depth.

Second, "lighthouses" represent secondary verification objectives (coverage properties) used to reflect netlist scenarios of interest. A lighthouse that is encountered for the first time during a search of depth "k" is known to be reachable at depth "k," although it may also be reachable along a search of shallower depth.

A relatively simple approach to ensuring adequate search depth to expose deep netlist bugs is to progressively continue with a deeper search (i.e., more iterations of deeper simulation depth within a trial). This can be performed as long as the continued depth yields additional coverage. However, this approach, while yielding new coverage, offers relatively no insight into whether the same coverage could be obtained in a shallower search.

Therefore, embodiments of the present invention attempt to saturate coverage using a shallower search before incrementally deepening the search to assess whether coverage improves. Assessing coverage saturation itself is a relatively complex process. With relatively large coverage models, coverage closure (i.e., the number of coverage objectives reached per unit of effort—such as simulation steps or collective simulation and symbolic search within an iteration) often is an exponentially decreasing curve. That is, earlier in the search process, a relatively large number of coverage points are reached per unit of effort. Later in the search process, an increasingly smaller number of coverage points are reached per unit of effort. Thus, embodiments of the present invention utilize an adaptive coverage saturation criterion that starts larger and decreases as overall coverage saturates. This is done as opposed to using a set or fixed saturation metric or value.

Also, embodiments of the present invention balance between increasing simulation depth as compared to the number of iterations per trial. Using too small of a simulation depth can entail using a relatively large number of resources to go deeper into the netlist. This can become prohibitive if the netlist behavior is relatively deep.

Therefore, embodiments of the present invention include a method of semi-formal electronic hardware or integrated circuit design verification that includes modifying the simulation depth or the number of simulation or state space exploration iterations in response to a measure of coverage achieved by a prior iteration. An adaptive search or bug hunting technique identifies the inherent depth of a netlist, avoiding the overhead of deeper-than-necessary search and counterexamples, while being relatively immune to the risk that the search is not performed deep enough (i.e., too shallow) to expose relatively deep counterexamples. Also, an adaptive technique is provided to differentiate deep coverage progress from being intrinsically deep versus encountered unnecessarily deep, thereby adaptively tailoring the search not only to be relatively more shallow if such a shallow search is adequate for a given netlist, but also converting deeply covered behaviors to be encountered in the shallower search.

Figures 4, 4C:
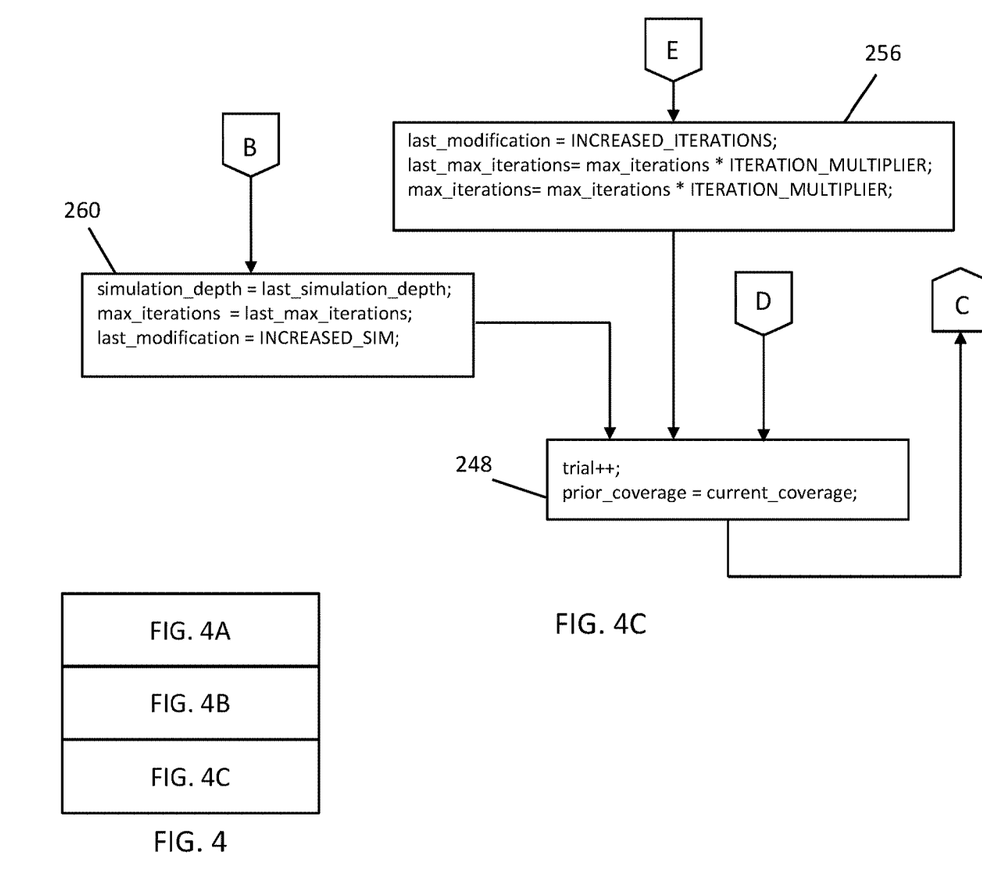
Figure 4A:
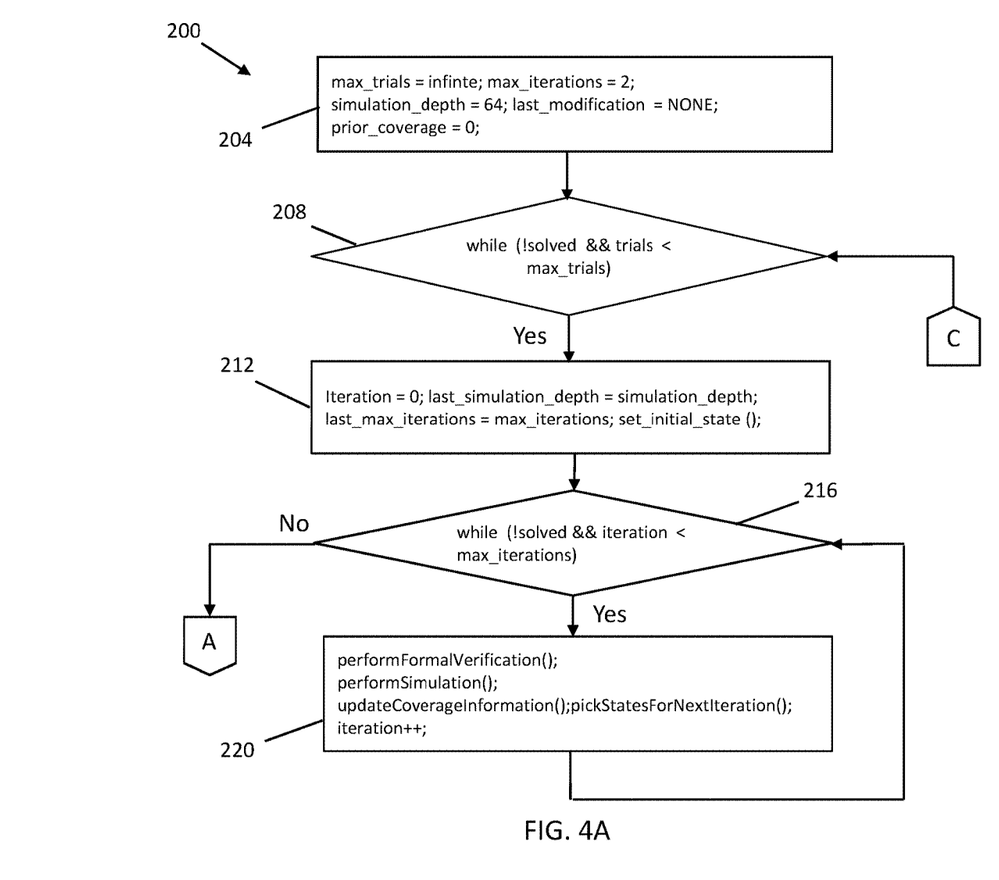
Figure 4B:
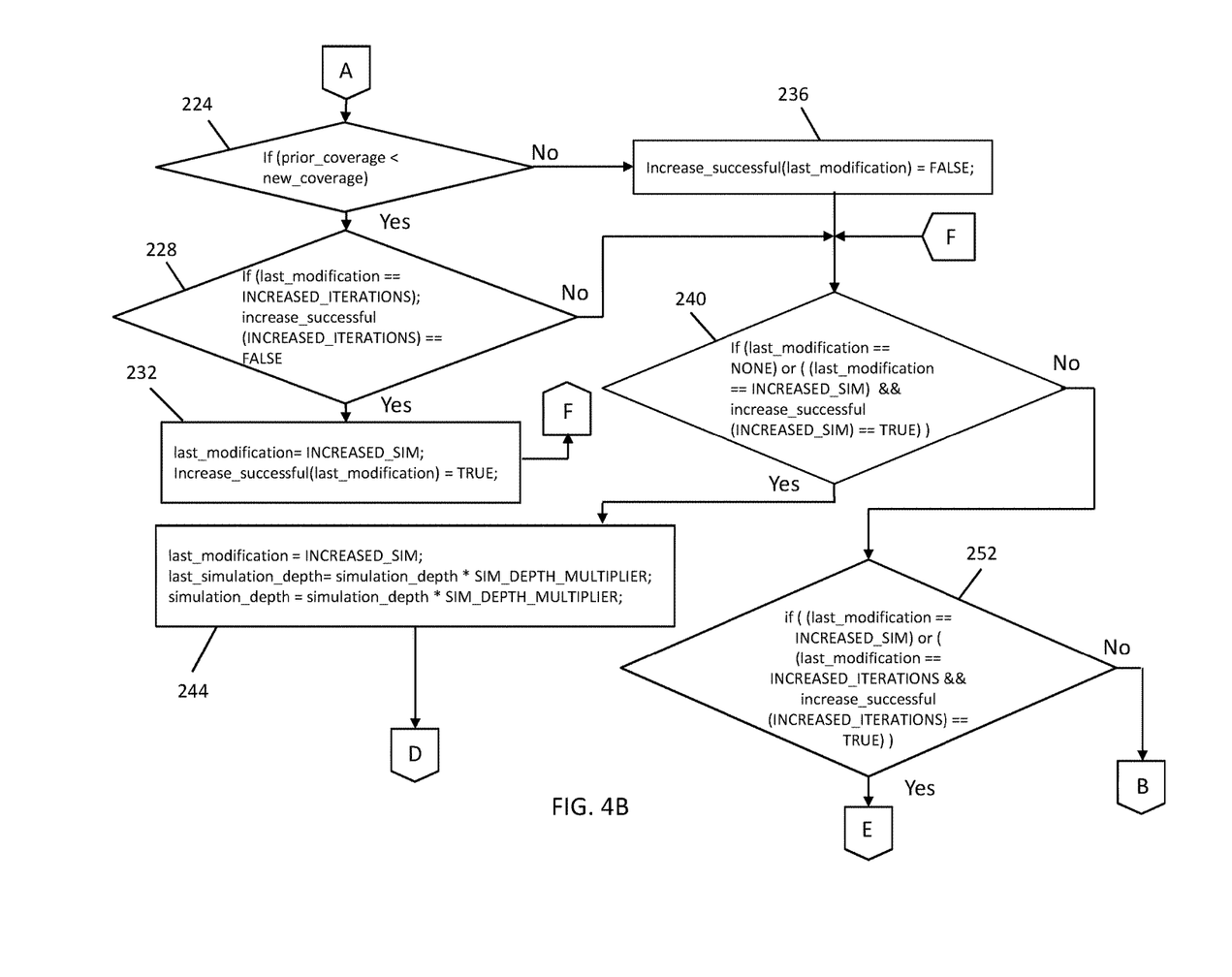

Referring now to FIG. 4, there illustrated is an exemplary embodiment of a flow diagram of a method 200 for semi-formal bug hunting within a hardware or integrated circuit design. In one or more embodiments of the present invention, the method 200 may be embodied in software that is executed by computer elements located within a network that may reside in the cloud, such as the cloud computing environment 50 described hereinabove and illustrated in FIGS. 1 and 2. Similarly, the methods 300 and 400 of FIGS. 5 and 6, respectively, may also be embodied in software. In other embodiments, the computer elements may reside on a computer system or processing system, such as the processing system 100 described hereinabove and illustrated in FIG. 3, or in some other type of computing or processing environment now known or hereinafter created. The software embodying the methods 200, 300, 400 may comprise any suitable programming language, for example, such as C or C++, or any other suitable programming language.

The method 200 of FIG. 4 provides a semi-formal error or bug hunting framework or approach which automatically tailors the depth of simulation and number of iterations per trial to the native depth of the netlist. The various operations depicted in the flow diagram of FIG. 4 are shown in that figure as both pseudo-code for the C programming language and as actual software code in the C programming language. This is also similar to the depiction of the methods 300 and 400 of FIGS. 5 and 6, respectively.

In an operation in block 204, a number of variables have their values set; for example, the maximum number of trials ("max_trials" set equal to infinity), maximum number of iterations per trial ("max_iterations" set equal to 2), the simulation depth which is the number of simulation cycles ("simulation_depth" set equal to 64), etc.

Through setting of the values for these variables, the search or bug hunting method can begin relatively shallow, with simulation limited to a relatively shallow depth of simulation cycles (for example, 64 simulation cycles can be effective), and with a small number of iterations per trial (e.g., 2). The number of iterations per trial may be limited to a single trial, to keep the search relatively very shallow. However, this has the downside that later iterations have no opportunity to guide the search. A setting of two thus allows for some rarity guidance while allowing for a relatively shallow overall search.

In an operation in block 208, a check is performed to see if the number of trials in the current pass through the method 200 of FIG. 4 is less than the maximum number of trials. If so, an operation in block 212 sets some state variables for an initial or first iteration of the method 200.

An operation in block 216 checks if the number of iterations of the method 200 performed so far is less than the value of the maximum number of iterations set in the operation in block 204. If so, an operation in block 220 performs both a formal verification process and a simulation process on the hardware design ("testbench"). The formal verification process may include the performance of symbolic analysis to attempt to falsify properties and hit lighthouses. Also, the simulation process may include simulation that attempts to falsify properties and hit lighthouses. The operation in block 220 also updates the coverage information, sets the states for the next iteration of the method 200, and increases the value of the iteration variable by one to set up for the next iteration of the method 200.

If the operation in block 216 determines that the number of iterations of the method 200 performed so far is equal to the value of the maximum number of iterations set in the operation in block 204, an operation in block 224 checks if the prior amount of coverage is less than the current amount of coverage. More specifically, the prior amount of coverage may be checked to see if it is significantly less than the new coverage achieved within the last, e.g., 50% of iterations of the newly completed trial.

If so, an operation in block 228 checks if the value of "last_modification" equals the value of "INCREASED_ITERATIONS," and if the value of "increase_successful (INCREASED_ITERATIONS)" is false. If so, an operation in block 232 sets the value of "last_modification" equal to the value of "INCREASED_SIM," and sets the value of "increase_successful (last_modification)" to true.

If the operation in block 224 determines that prior amount of coverage is not less than the current amount of coverage, an operation in block 236 sets the value of "increase_successful (last_modification)" to false.

Regarding the operations in blocks 224, 228, 232, 236, essentially when a trial completes, an evaluation of the coverage achieved within the trial is performed to see if the trial is considered effective compared to the prior coverage—specifically the coverage obtained in the deeper iterations. This analysis can be configurable, looking for any non-zero coverage improvement, or a small percentage of coverage improvement. Regardless of the criterion, the coverage of the newly completed trial is compared to that of the prior trial to see if any modification of search depth was determined to be successful. Note that this comparison can take into account the fact that the newly completed trial likely consumed more resources than the prior trial (more simulation and/or more iterations) to determine comparative effectiveness. Note that the operation in block 228, 232 is responsible for changing the strategy from INCREASED_ITERATIONS back to INCREASED_SIM after the former has become ineffective. This allows for the continued deepening of both if a deeper netlist behavior is discovered in later trials.

An operation in block 240 checks if "last_modification" equals zero or "NONE," or if "last_modification" equals "INCREASED_SIM" and "increase_successful (INCREASED_SIM)" is true. If so, an operation in block 244 sets "last_modification" to "INCREASED_SIM," and sets "last simulation_depth" and "simulation_depth" both to "simulation_depth*SIM_DEPTH_MULTIPLIER."

An operation in block 248 increments the number of trials by one, and sets "prior_coverage" equal to "current_coverage." This increase the value of the number of trials performed variable and also sets the coverage value accordingly.

Essentially, in the operations in blocks 240, 244, the adaptive search method 200 first increases the simulation depth, changing "last_modification" from NONE to "INCREASED_SIM," and also multiplying the simulation depth by a configurable parameter "INCREASED_SIM." This value can be, for example, at least two. Note that relatively deep logic constructs such as counters and shift registers exhibit some new behavior within two times the search depth until the search depth is adequate to cover their behavior. The adaptive search of the method 200 will continue to increase the simulation depth until doing so has no positive impact on comparative coverage achieved.

If the result of the operation in block 240 is not, an operation in block 252 checks if "last_modification" equals "INCREASED_SIM" or if "last_modification" equals "INCREASED_ITERATIONS" and "increase_successful (INCREASED_ITERATIONS)" is true. If so, an operation in block 256 sets the value of "last_modification" to the value of "INCREASED_ITERATIONS," and sets the value of "last_max_iterations" and "max_iterations" both to the value of "max_iterations*ITERATION_MULTIPLIER." The method 200 then performs the operation in block 248.

In the operation in block 256, the adaptive search method 200 increases the number of iterations by changing "last_modification" from "INCREASED_SIM" to "INCREASED_ITERATIONS," and also multiplying "max_iterations" by the parameter "ITERATION_MULTIPLIER." This value can be at least two in practice, similar to the reasoning above with respect to netlist depth. The adaptive search method 200 continues to increase the number of iterations until doing so has no positive impact on comparative coverage achieved.

If the result of the operation in block 252 is not, an operation in block 260 sets or restores "simulation_depth" equal to "last simulation_depth" and "max_iterations" equal to "last_max_iterations," and sets "last_modification" equal to "INCREASED_SIM." The method 200 then performs the operation in block 248.

Essentially, these parameters were increased without improving coverage. That is, if no coverage improvement was achieved while increasing both the simulation depth and the number of iterations, the next trial will be performed using the values saved from the prior update. Note that the simulation depth and the number of iterations are both permanently retained at their last-increased values, even when no significant coverage improvement was achieved in this doubling. The reason is that it is desired to balance approximately half the search resources to within the known netlist depth, and half beyond the known depth, such that if the netlist is truly deeper than has been discovered in prior trials, this offers a useful balance to avoid much greater search depth than likely beneficial, while still leveraging about half of the search effort into discovering deeper behaviors. However, as more trials are completed with these settings, the process should not be allowed to continue increasing depth for no gain.

After the operation in block 248 is performed, the method 200 branches to the operation in block 208.

In the method 200 of embodiments of the present invention, as new coverage is obtained during later trials, the process of deepening the search is continued only if this coverage was obtained in the last 50% of the iterations within the newly completed trials. Otherwise, if the coverage was obtained in the shallower iterations, there is no point in increasing search depth since the new coverage was already in the shallower half of the search depth.

Embodiments of the method 200 are effective at preventing the overhead of excessive search depth (particularly, minimizing the difficulty of debugging longer-than-necessary counterexamples), while allowing deep counterexamples to be found if the netlist is deep. Note that with a pre-specified simulation depth and a maximum number of iterations per trial, there is little or no chance of finding a counterexample deeper than the multiplication of these two parameters.

Figure 5:
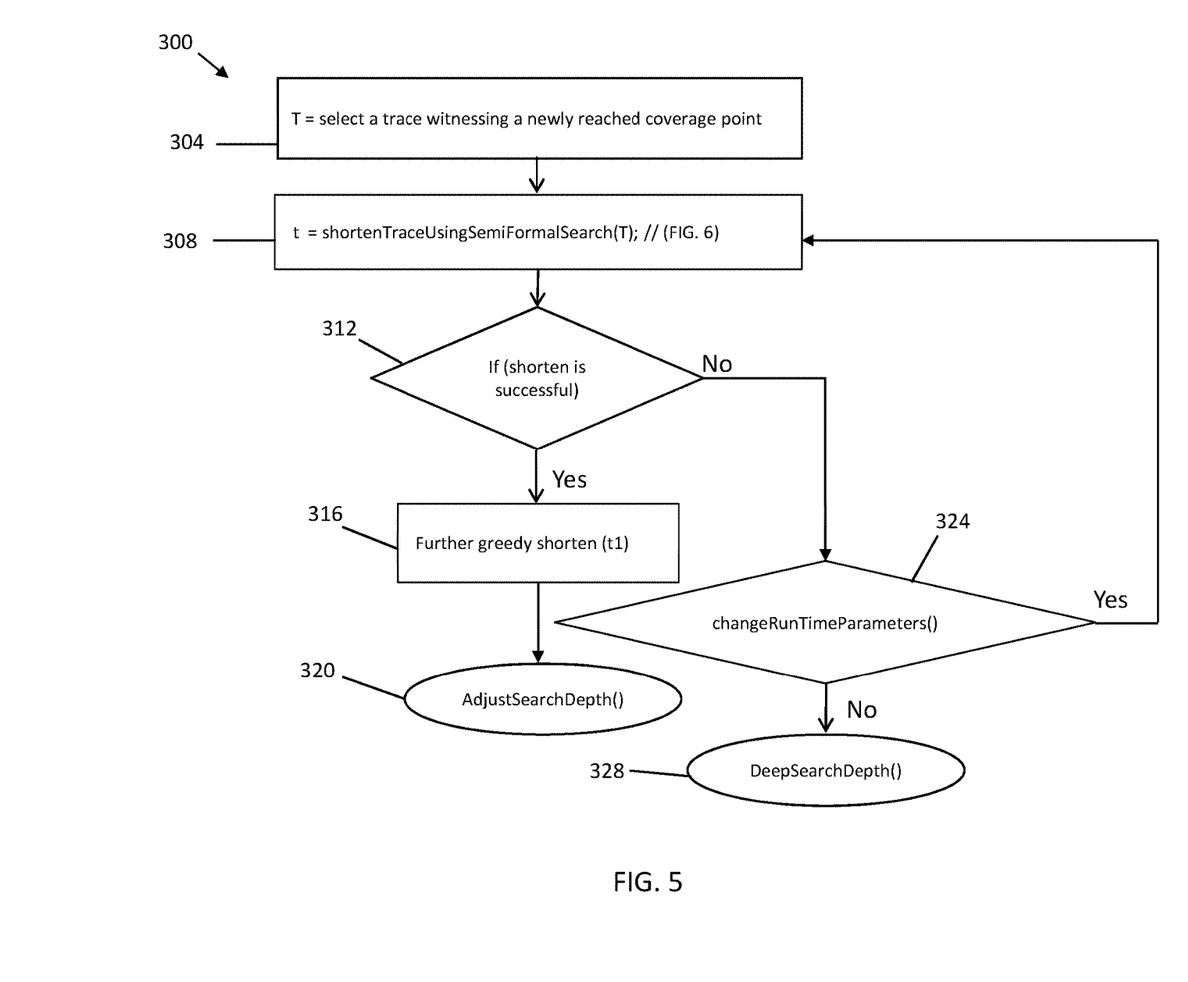
FIG. 5 is a flow diagram of a more detailed method of a portion of the method of the flow diagram of FIG. 4 in accordance with one or more embodiments of the present invention.

Referring now to FIG. 5, there illustrated is a flow diagram of a method 300 for implementing a portion of (i.e., the operations 224-236 in) the method 200 of FIG. 4. The method 200 of FIG. 4 may successfully tailor, adapt or modify the search depth to the exposed or witnessed netlist depth. However, there may be a possibility of a coverage objective being reached at a depth N that may instead be possibly reached at a shallower depth. Thus, the method 300 of FIG. 5 may provide a relatively more robust solution to assessing the true netlist depth. That is, the method 300 identifies any relatively deep coverage as being intrinsic versus being unnecessarily long. Specifically, the operations in blocks 224-236 of the method 200 of FIG. 4 may be modified to qualify the "new coverage achieved within the last 50% of iterations" as follows.

In FIG. 5, in an operation in block 304, a trace T is selected that found or "witnessed" a newly reached coverage point from a deep iteration. In an operation in block 308, an attempt is made to shorten the selected trace T ("t" is the general trace length; "t1" is the trace length of a specific trace), for example, using a semi-formal search algorithm (such as that of the method 400 of the flow diagram of FIG. 6, as discussed hereinafter).

An operation in block 312 checks if the length "t" of the selected trace is successfully shortened to within the depth of the early, e.g., 50% of iterations. If so, an operation in block 316 seeds or places one or more semi-formal iterations into the shortened trace (e.g., "t1") to "greedily" convert coverage progress more shallowly. An operation in block 320 correspondingly adjusts the search depth.

If the length of the trace is not successfully shortened (i.e., the trace length "t1" remains "deep"), an operation in block 324 checks if a run-time parameter has been changed, and if so, the method 300 branches back to the operation in block 308 to again attempt to shorten the length of the trace. If a run-time parameter has not been changed, an operation in block 328 acknowledges the deep coverage progress of the method 300 and increases the search depth.

The method 300 of the flow diagram of FIG. 5 attempts to determine or compute relatively shallower traces for some deep coverage points, up to a configurable runtime threshold. If the shortening succeeds and yields a depth that is not within the prior increase in search depth, there is a relatively significant possibility that the coverage achieved in this trial is all, or at least mostly, shallowly reachable.

In the operation in block 316, a reason that one or more semi-formal iterations are seeded or placed into the shortened trace states is that often a trace witnessing one new coverage event will also witness a large number of other coverage events, especially if the trace is extended. Since trace shortening can be relatively expensive, the method 300 of FIG. 5 is a relatively easy way to cross-leverage the shortening of one trace to many other coverage points. Furthermore, if any properties are falsified in this effort, a relatively shorter counterexample can be provided as a byproduct, easing the debug effort. It may be sometimes helpful to seed or place more than one semi-formal iteration from different points along one shortened trace, to avoid the above-mentioned complication that seeding or placing an iteration into a particular state may eliminate the possibility to reach other netlist behaviors due to search decisions locked into that state.

Figure 6:
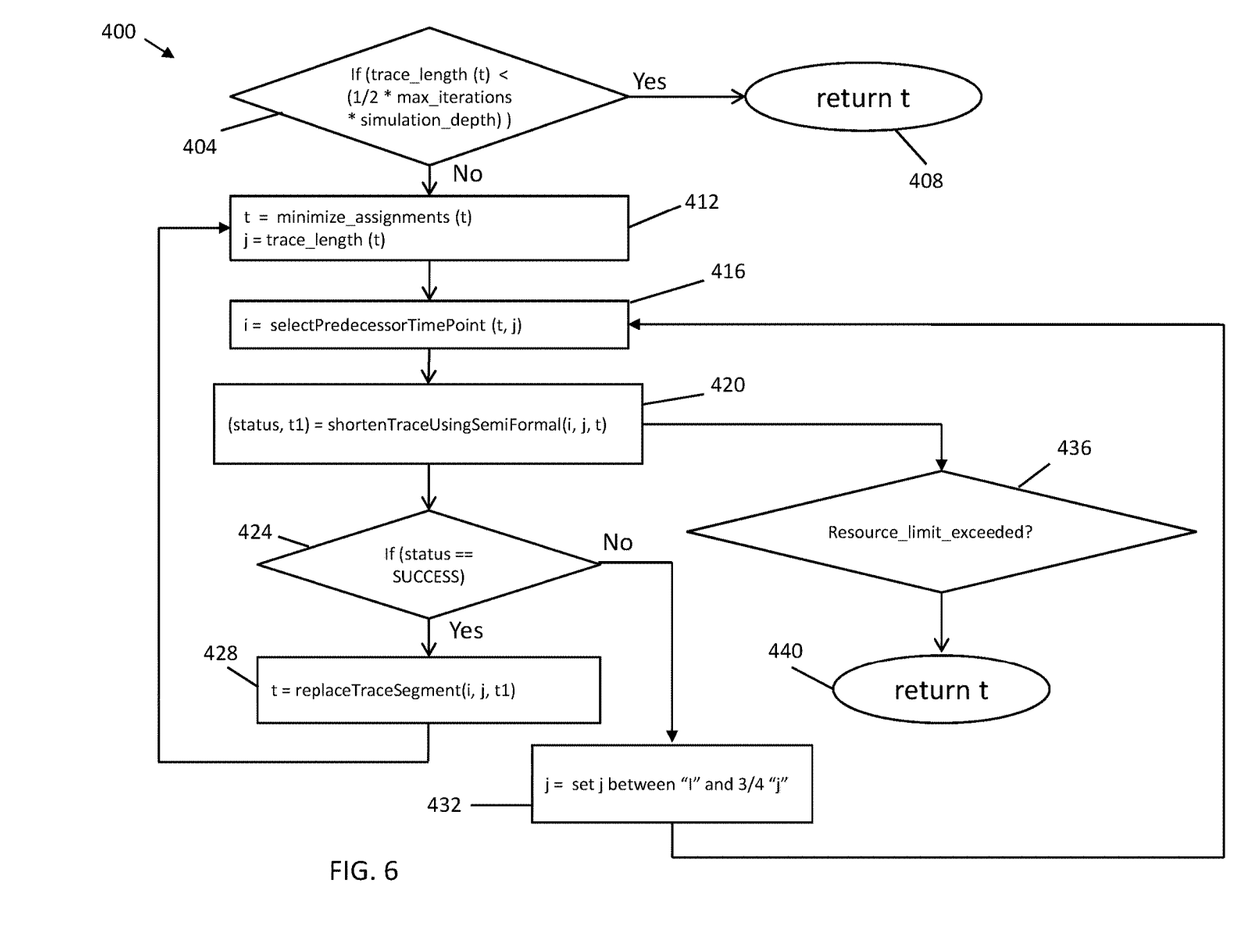
FIG. 6 is a flow diagram of a more detailed method of a portion of the method of the flow diagram of FIG. 5 in accordance with one or more embodiments of the present invention.

Referring now to FIG. 6, there illustrated is a flow diagram of an exemplary method 400 for implementing the operation 308 in the method 300 of FIG. 5. That is, as described above, the operation in block 308 of FIG. 5 attempts to shorten the selected trace length "t" using a semi-formal search algorithm or operation. The method 400 of the flow diagram of FIG. 6 depicts this trace length shortening operation.

An operation in block 404 checks if the original length "t" of a trace is less than one half the variable "max_iterations" multiplied by the variable "simulation_depth." If so, an operation in block 408 returns the variable "original_trace" ("t") as a successful shortening. If not, an operation in block 412 minimizes the assignments in "original_trace" to be adequate enough to expose the desired potentially-deep coverage event. The operation in block 412 also sets the time value of "j" to the length of "original_trace." Originally, "j" is taken as the final timestep of the trace.

An operation in block 416 selects a prior or intermediate arbitrary timestep value of "i" to be before (or lesser than) the value of time "j." For example, "i" may be set to one half the value of "j." Otherwise, the value of "i" can be set to be more shallow or deep with respect to the value of "j."

An operation in block 420 attempts to tunnel or proceed from the state at time "i" to the state at depth "j" with depth <"j"–"i" for example, using a symbolic search and simulation approach. An operation in block 424 checks if the shortening operation in block 420 was successful (i.e., it yielded a shorter trace length value). If so, an operation in block 428 shortens the value of "original_trace" by replacing the value of time "i" . . . "j" with the value of "shorter_trace." The method 400 returns to the operation in block 412. If not (i.e., the shortening operation 420 failed), set the value of "j" to be somewhere between the value of "i" and 0.75 times the value of "j." The method 400 returns to the operation in block 416.

An operation in block 436 checks (as a parallel operation to that of operations 424, 428, 432) if, as a result of the shortening operation in block 420, the resource limits have been exceeded. If so, an operation in block 408 returns the variable "original_trace" ("t") as an unsuccessful shortening.

The method 400 of the flow diagram of FIG. 6 can be utilized to attempt to shorten the trace length. The method 400 works iteratively backward from the original length of the trace, trying to find a shorter path from an intermediate state at time "i" to a later state at time "j." In other words, the method 400 acts to determine if the same netlist depth can be reached in a shorter path. Shortening the trace length from later timesteps to earlier timesteps (i.e., working backward) can be more effective than the converse (i.e., working forward), since if successful this approach can obviate many unnecessary deeper states from the trace. Instead, if working forward, for example, to try to find a shorter path from the initial state to one half-way through the trace, even if successful this approach may lock the half-way state into the shortened trace. If working backward, even if successful shortening from the mid-way state to the final state and thus including the mid-way starting state in the trace, the next iteration of this shortening process has a greater chance of eliminating this mid-way point.

Working backward can also allow for the trace to be assignment-minimized using standard justification techniques to include minimal assigned values adequate to witness the coverage event being shortened. For example, if trying to justify a 1 at the output of an AND gate, one would need to justify every input of the AND gate as a 1. However, if justifying a 0 at the output of an AND gate, one would only need to justify a 0 at an arbitrarily selected input. Also, shortening tends to unassign more values later in the trace, thereby significantly reducing resources from the search process in the operation in block 420 (which need only attempt to tunnel between minimized states—i.e., the fewer assigned state variables, the simpler this problem is). Further, the minimized states increase the chance of successful shortening, because fewer state variables need to be checked for equality in the shortened trace as compared to the original trace. If shortening is successful, the method 400 repeats trying to shorten from the final timesteps. Note that trace minimization is re-done in this case, to exploit the greater assignment minimization possible in the shorter trace. Although if trace minimization fails (i.e., the search fails to find a shorter path), the method 400 repeats trying to shorten an earlier segment of the trace.

Thus, in embodiments of the present invention, the method 300 of FIG. 5 and the method 400 of FIG. 6 both act to check the effectiveness of the method 200 of FIG. 4, while also strengthening the method 200 of FIG. 4.

Embodiments of the present invention automatically expose relatively deep counterexamples without a need for manual configuration of the semi-formal search process. Embodiments also to produce significantly shorter counterexamples when they exist by avoiding an unnecessarily-deep and arbitrarily-chosen search. Embodiments also tend to significantly improve the ability to find counterexamples on netlists with many initial states, by reducing the overhead of searching unnecessarily deeply and thereby increasing the number of initial states that can be explored in a given resource limit.

Embodiments of the present invention as described herein relate to the verification of a design of an integrated circuit. Thus, the described embodiments relate to the design of the integrated circuit as well as its manufacture. That is, as the integrated circuit is designed and with the design verified as described herein, the subsequent manufacture of the integrated circuit can take place using known methods and equipment. For example, the equipment used in the manufacture of the integrated circuit can include one or more computers, such as, for example the computers disclosed as part of the cloud computing environment 50 of FIG. 1, or the processing system 100 of FIG. 3, or by some other configuration of equipment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising:
   a processor in communication with one or more types of memory, the processor configured to:
      provide a netlist indicative of connectivity and functional states of components of an integrated circuit design;
      iteratively search through the netlist at a selected depth to locate errors within the netlist by a plurality of trials, each of the plurality of trials having a plurality of iterations, wherein iteratively searching through the netlist at a selected depth to locate errors within the netlist comprises performing a simulation process and a symbolic analysis process;
      adaptively adjust the selected depth depending on any errors within the netlist being located, the selected depth increasing over time from an initial value as between the plurality of iterations;
      adaptively adjust an amount of coverage of the netlist depending on any errors within the netlist being located, the amount of coverage of the netlist decreasing over time from an initial amount as between the plurality of iterations; and
      manufacture the integrated circuit design.

2. The computer system of claim 1 wherein the selected depth of the netlist comprises a number of simulation cycles by which the processor is configured to iteratively search.

3. The computer system of claim 1 wherein an amount of coverage of the netlist is determined by at least one of analysis of the functional states of the components of the integrated circuit design and of analysis of secondary properties of the components of the integrated circuit design.

4. The computer system of claim 1 wherein the processor is further configured to determine a depth of the netlist depending on a length of a trace associated with a gate component of the integrated circuit design, and to shorten the length of the trace, wherein the trace comprises a sequence of valuations of the gate component of the integrated circuit design.

5. The computer system of claim 4 wherein the processor is further configured to shorten the length of the trace starting from a first state of the gate component that is later in time than a second state of the gate component.

6. The computer system of claim 1 wherein the processor is located in a cloud computing environment, and wherein the program instructions are implemented in software run by the processor located in the cloud computing environment.

7. A computer program product comprising:
   a storage medium readable by a processing circuit and storing instructions for execution by the processing circuit for performing a method of designing an integrated circuit comprising:
      providing a netlist indicative of connectivity and functional states of components of the integrated circuit design;
      iteratively searching through the netlist at a selected depth to locate errors within the netlist by a plurality of trials, each of the plurality of trials having a plurality of iterations, wherein iteratively searching through the netlist at a selected depth to locate errors within the netlist comprises performing a simulation process and a symbolic analysis process;
      adaptively adjusting the selected depth depending on any errors within the netlist being located, the selected depth increasing over time from an initial value as between the plurality of iterations;
      adaptively adjusting an amount of coverage of the netlist depending on any errors within the netlist being located, the amount of coverage of the netlist decreasing over time from an initial amount as between the plurality of iterations; and
      manufacturing the integrated circuit design.

8. The computer program product of claim 7 wherein the selected depth of the netlist comprises a number of simulation cycles by which iteratively searching by the processing circuit is performed.

9. The computer program product of claim 7 wherein an amount of coverage of the netlist is determined by at least one of analysis of the functional states of the components of the integrated circuit design and of analysis of secondary properties of the components of the integrated circuit design.

10. The computer program product of claim 7 further comprising determining a depth of the netlist depending on a length of a trace associated with a gate component of the integrated circuit design, and shortening the length of the trace, wherein the trace comprises a sequence of valuations of the gate component of the integrated circuit design.

11. The computer program product of claim 10 further comprising shortening the length of the trace starting from a first state of the gate component that is later in time than a second state of the gate component.

* * * * *